United States Patent Office 3,186,976
Patented June 1, 1965

3,186,976
PROCESS FOR IMPROVING PHYSICAL AND CHEMICAL PROPERTIES OF HIGH POLYMERS
Pierre Baumgartner, Asnieres, France, assignor to Institut Français de Petrole des Carburants et Lubrifiants, Paris, France
No Drawing. Filed May 11, 1960, Ser. No. 28,230
Claims priority, application France, May 13, 1959, 794,518; July 27, 1959, 801,401; Dec. 24, 1959, 814,292
19 Claims. (Cl. 260—93.7)

The present invention relates to a new and useful process for treating hydrocarbon high polymers so as to substantially increase their chemical affinity for dyeing materials; and to improve their physical properties in view of their use as raw materials for manufactured products.

Until now, the dyeing of hydrocarbon high polymers, due to their high degree of physical and chemical inertness, was not possible except by incorporating dyeing material into a polymer when the latter is in the liquid or plastic state prior to the step of fabrication.

Moreover, the only way for applying color printing to fabricated polymeric articles was to apply to the external surface thereof an adhesive dyeing material. However, the adhesiveness of such materials is generally insufficient to secure the maintenance of the color printing on the hydrocarbon polymer for a satisfactory period.

These two dyeing methods known in the art are, however, not applicable to the dyeing of fibers made of a hydrocarbon polymer.

It is, therefore, one object of my invention to provide a new and useful process for producing printing on hydrocarbon high polymers, which process is not only applicable to a polymer in a liquid or plastic state, but also to a solid polymer, for example, in the form of a manufactured article. Such color printing may be achieved, according to my invention, either in a one-stage or in a two-stage process.

It is another object of my invention to provide a process for dyeing hydrocarbon high polymers, which may be carried out under normal conditions of temperature, corresponding to the solid state of the polymer.

It is still another object of my invention to carry out dyeing of hydrocarbon high polymeric materials in such a manner that their tint remains stable even in the presence of agents known to have a harmful effect on dyed materials, such as light, heat and certain chemical products.

In attaining the objects, I have also discovered that the treatment of hydrocarbon high polymers according to my invention which gives to the latter an affinity for dyestuffs also imparts to said polymers new physical properties which are of interest in numerous fields of utilization of said polymers.

These particular new properties of high polymers treated according to my invention are substantially A reduced capability for being charged with static electricity; and An increased adhesiveness of said polymers to other materials.

It is, therefore, a further object of my invention to provide treated high polymers and manufactured articles thereof which do not suffer from the usual drawback of non-treated polymers resulting from their susceptibility to be charged with static electricity. This new and useful property of the polymers treated according to my invention is of great advantage in various industries and particularly in the fields of textiles, phonograph records, films, magnetic tapes and the like.

It is a still further object of my invention to increase the adhesiveness of hydrocarbon high polymers to other materials such as metals, papers, polyamides, polyesters, cellulose derivatives, etc., by submitting said polymers to the treatment according to my invention. The improved adhesiveness of the so-treated polymers is also of interest for making pieces or articles of said polymers to adhere to each other by use of a conventional adhesive agent.

These and other objects and advantages of my invention as will appear from the detailed following description are achieved by the process of the present invention comprising contacting the hydrocarbon high polymers to be treated with a chromyl halide under operating conditions as hereinafter defined.

As examples of the hydrocarbon high polymers which may be subjected to the treatment according to my invention are to be mentioned alpha ethylenic polymers, particularly polyethylene, polypropylene, polyisobutylene, polystyrene, and their substituted derivatives such as polyvinyl chloride, acetate, alcohol, formal, acetal and butyral, polytetrafluoroetylene, polyvinylidene chloride, polyacrylonitrile, polymethacrylonitrile and the like, as well as the corresponding copolymers.

Though the improvement of the physical and chemical properties of the hydrocarbon high polymers resulting from the treatment according to my invention is particularly significant in the case of said above-mentioned compounds, the scope of my invention is not limited to the latter since improved properties are still conferred by said treatment to other polymeric materials such as polyesters, polyamides, cellulose esters and ethers, and the like.

The treatment according to my invention is based on the discovery of an affinity between hydrocarbon high polymers and chromyl halides, the nature of which, physical or chemical, is, however, not yet ascertained.

Said affinity results in a sensitiveness of the polymer to the action of dyestuffs, in a reduction of its tendency to be charged with static electricity and in a certain coloration of the hydrocarbon high polymer when contacted with chromyl halide and particularly with chromyl chloride.

The intensity of said direct coloration due to the mere action of chromyl chloride depends upon the duration of the contact of the polymer with chromyl chloride, the content in chromyl chloride of the contacting agent used, the kind of polymer treated and of the solvents which may be eventually employed, the operating temperature and other analogous factors. Said direct coloration is usually orange, greenish, brown or black, and naturally tends to evolve from the orange to the green or the black.

The effect of the treatment according to my invention on the properties of the hydrocarbon high polymers is more or less intense according to its duration. However, an affinity of the polymers for dyestuffs is observed even after contact durations as short as one tenth of a second, which short durations are, however, insufficient to result in any significant coloration of the polymer due to the mere action of chromyl chloride. The affinity for dyeing materials as well as the intensity of the coloration resulting from the action of chromyl chloride are both increased with increasing contact durations while the tendency of the polymers to be charged with static electricity is decreased.

In most cases and particularly when the treatment according to the invention is carried out at the ambient temperature, a contact duration in the range of one minute to one hour leads to very satisfactory results. It is, however, unprofitable to unduly extend the duration of the treatment for instance over more than 24 hours, since this would result in a reduction of the output rate which is not counterbalanced by any noticeable further improvement of the polymer properties.

An essential and advantageous feature of the process of my invention resides in that it may be carried out under normal temperature conditions, though however higher or lower temperatures are also permissible. As a general rule it is preferred to use the shortest durations of treatment with the highest temperatures and vice versa. However, when treating manufactured products made of a polymeric material, too high temperatures, which may possibly result in a softening of said polymeric material, should be avoided.

In all cases, even when the treatment according to the invention is applied to polymers in a liquid or viscous state during the process of manufacturing articles at a relatively high temperature, the latter must, however, be kept lower than that at which a noticeable deterioration of the polymer occurs.

The chromyl chloride may advantageously be used as such in the liquid or vapor state, even under ambient temperature, or dissolved in a solvent thereof, provided that the latter is substantially inert in the presence of both chromyl halide and the treated polymer.

The chromyl halide may also be formed in situ, i.e., in the vicinity of the treated polymeric material, as the product liberated during a concomitant reaction known for producing said chromyl halide. Such a reaction may be carried out for instance by using a mixture of a chromate or bichromate of an alkali or alkaline earth metal with hydrochloric acid or a chloride, in the presence of sulfuric acid or another strong acid, or of chromium trioxide with hydrochloric acid in the presence of sulfuric acid or of chromium trioxide or a bichromate with an acid chloride such as for example oxalyl, acetyl or pyrosulfuryl chloride or phosphorus pentachloride. However, any other known reaction producing chromyl chloride or another chromyl halide may be used according to the invention.

Among the various substantially inert solvents for chromyl chloride which may be used for carrying out the process of my invention the halogenated solvents such as methylene chloride, chloroform, carbon tetrachloride, tetrachloroethane, dichloroethane, dibromoethane, benzene chloro-derivatives and acetyl chloride are particularly suitable. Inorganic solvents such as tin tetrachloride, thionyl chloride and silicones, particularly in the paste form, are also suitable for carrying out the process of my invention. However, other solvents may be used which are not so inert to the action of chromyl chloride, such as acetic acid or anhydride, nitrobenzene, concentrated nitric acid, benzene, cyclohexane, carbon sulfide, if necessary precautions are taken for their use.

Solvents in which the hydrocarbon high polymer may be substantially dissolved during the reaction must be preferably avoided, particularly when treating manufactured articles.

The so-treated polymer may advantageously be freed from the last traces of chromyl chloride by washing it with water or with an organic or a mineral solvent. It thus exhibits a more or less intense color which tends to become intensified during the few hours following the treatment. Such evolution of the color may be accentuated at will by subjecting the polymer to moderate heating or to exposure to light.

Said coloration remains stable and has been proved to be resistant to attacking agents, provided that the latter do not dissolve or decompose the polymer.

If the entire surface of the polymer is submitted to the action of chromyl chloride, a substantially uniform coloration of the surface is obtained. However, where it is desired to provide the polymer with color printings on its surface, only those parts of its surface on which said color printings are to be effected, must be submitted to the action of chromyl chloride. According to the desired result chromyl chloride may be used for example as an ink for writing on the polymer surface or, on the contrary, the entire surface of the polymer, except a part of the latter covered by a stencil-plate, is submitted to the action of chromyl chloride. This last way for making color printings on the surface of the polymer is particularly suitable for printing a label or a drawing on a manufactured article made of a polymeric material. Printing of a trademark, the manufacturer's name or directions for use are of particular interest on manufactured products. Such printings as well as printing of signs, for example, of graduations of volume on a container made of a hydrocarbon high polymer, may be easily carried out according to my invention.

As set forth above, the colorations of the hydrocarbon high polymer resulting directly from the action of chromyl chloride is limited to a few number of tints, i.e., orange, green and black, the two first of which are furthermore devoid of a sufficient stability during the few hours immediately following the treatment and evolve under the action of light or heat as mentioned above.

It is thus more suitable, if it is desired to dye hydrocarbon high polymers, to take advantage of the fact that by the treatment of said polymers with chromyl chloride, a high degree of affinity for dyestuffs is imparted to the polymers.

This affinity is quite an unexpected phenomenon in view of the prior art since, as already set forth, up to now, the dyeing of hydrocarbon high polymers and more particularly of polyolefins and polyvinyl chloride could not be achieved by simple methods, since, in most cases, and especially when a sufficient stability of the coloration was desired, it was necessary to color the whole mass of said polymers prior to making manufactured articles, for instance, by use of pigments. Such a method suffers from the drawbacks of limting the dyeing possibilities to a few number of tints and of rendering impossible any further change of color of a manufactured article which is made of a previously dyed polymer.

In contrast, according to my invention, hydrocarbon high polymers, after treatment with a chromyl halide, may be directly submitted to the action of dyestuffs under the simple and conventional conditions associated with the dyeing of fibers, i.e., by immersion of the polymer into a bath of a conventional dyestuff.

The delay between the treatment with the chromyl halide and the dyeing operation is not critical. The dyeing step may be carried out just after the treatment with the chromyl halide as well as several months thereafter. However, when practicing this invention in an industrial plant, it would be more expedient and economical to carry out the dyeing step just after the treatment with the chromyl halide, particularly when using the so-called "oxidation-dyes" such as aniline, toluidines, diphenyl amine or other anilines, wherein it has been discovered that immediate treatment yields the best results.

The process according to my invention is applicable to fibers and fabrics made of hydrocarbon high polymers as well as to the mass of the polymeric material prior to its fabrication, or to the manufactured articles made therefrom.

In the above description, particular attention has been directed to the case of the use of chromyl chloride which constitutes the preferred chromyl halide for practicing the invention due to its low cost and its relatively high stability as well as to its simplicity of use and the high reproductibility of the results obtained therewith.

However, the scope of my invention is by no way limited to the use of said particular compound and other chromyl halides may as well be employed for practicing the invention. This is the case in particular of chromyl fluoride. The use of the corresponding derivatives of bromine and iodine may also be envisaged, if prepared in situ; this condition being, however, necessary since they cannot be isolated due to their high instability.

However, the results obtained by using chromyl bromide and chromyl iodide are not as good as in the cases where chromyl chloride and chromyl fluoride are employed. These two last chromyl halides and more particularly the chromyl chloride, are therefore preferred for carrying out my invention.

The following examples are illustrative of the process of my invention but are not to be considered in any way as limiting the scope of the appended claims.

Example 1

Into a polyethylene flask of 250 cm.$^3$ capacity is introduce 1 cm.$^3$ of chromyl chloride. The flask is kept corked for ten minutes. After washing with water, the flask exhibits a uniform orange color which progressively evolves over 5 hours to deep-green. An examination of a section of the flask has shown that the tint has penetrated inside the polyethylene mass to a depth of about 0.1 mm.

Example 2

Into a polyethylene flask is introduced a solution of 10 g. of chromyl chloride in 100 cm.$^3$ of carbon tetrachloride. The flask is maintained at a temperature of 30° C. for one hour. After emptying, and then washing with water, the flask exhibits a coloration which, after three hours, has evolved to deep-green.

Example 3

Into a flask of polyethylene containing in admixture 25 g. of chromic anhydride and 100 cm.$^3$ of concentrated hydrochloric acid, are introduced, drop by drop, 50 cm.$^3$ of concentrated sulfuric acid.

One hour after the end of this addition step the flask is emptied and washed according to the preceding examples. It exhibits a deep-green color.

Example 4

Into a polyethylene flask containing 10 g. of chromic anhydride, are introduced drop by drop 10 cm.$^3$ of chlorosulfonic acid ($HSO_3Cl$). Chromyl chloride is thus liberated, imparting to the flask a green coloration.

Example 5

Example 4 is repeated with a glass flask covered with a polyethylene sheet. After 30 minutes the sheet becomes green-colored.

Example 6

Example 5 is repeated except that under the polyethylene sheet is placed a stencil-plate having written thereon a trademark. After 30 minutes said trademark is impressed in green on the polyethylene sheet in a durable manner.

Example 7

A polypropylene textile is mimersed for 3 minutes into a solution of chromyl chloride in carbon tetrachloride having a 20% content of chromyl chloride. After its withdrawal from the solution, the polypropylene textile is washed in hot water with soap and thereafter immersed for 15 minutes into a bath, consisting of an aqueous suspension of a dyestuff consisting of amino-1, hydroxy-4 anthraquinone, and further containing a small amount of a surface-active agent (in occurrence sodium dodecylbenzenesulfonate) which bath is maintained at a temperature of 70° C. The polypropylene textile is then withdrawn from the bath, washed in hot water with soap and rinsed with water. It exhibits a fair mauve color, which is resistant to fading from washing.

Example 8

A polyethylene tissue is treated with chromyl chloride according to Example 7. After washing in water with soap and rinsing, the tissue is immersed into a bath consisting of an acetonic solution having a 5% content of Rhodamine B (dyestuff manufactured by "Compagnie Française des Matières Colorantes") and maintained therein for 30 minutes at a temperature of 50° C. After washings, as according to Example 7, the tissue exhibits a deep violet-red color.

Example 9

Example 7 is repeated except that the step of immersing the treated polypropylene textile into the dyestuff bath is carried out 24 hours after the treatment with chromyl chloride, the operating conditions being otherwise the same. The tissue exhibits the same coloration as in Example 7.

Example 10

Example 7 is repeated but with a dyestuff bath consisting of a solution containing a 5% concentration of picric acid in ethyl alcohol and maintained at a temperature of 60° C., in which the textile is immersed for 20 minutes. A fair yellow coloration of the textile is thus obtained.

Example 11

A polypropylene tissue is immersed at ambient temperature for 3 minutes into substantially pure chromyl chloride. After washings with water as described in Example 7, the tissue is immersed for 25 minutes into a bath consisting of an emulsion of aniline in water containing 5 parts by volume of aniline for each two parts by volume of water, said bath being maintained at a temperature of 25° C.

After washing with water, the tissue exhibits a deep black color.

Example 12

A skein of white polypropylene fibers is immersed for 3 minutes into substantially pure chromyl chloride. After washings with water as described in Example 7, said skein is immersed for 15 minutes into a bath of methyl violet. A deep violet coloration of the fibers is thus obtained.

The foregoing examples have only been given as illustrative of the method for carrying out my invention and, accordingly, many other types of coloration may be obtained by the method described in said examples by merely changing the nature of the dyestuff used. For instance, other dyestuffs which have been used with success are:

Acetoquinone yellow, manufactured by "Compagnie Française des Matières Colorantes."
Celliton 5 G, yellow, manufactured by "Badische Anilin- und Soda-fabrik."
Setacyl direct 2R supra, orange, manufactured by "Geigy."
Latyl GSS, red, manufactured by "Du Pont de Nemours."
Cibacete R, ruby, manufactured by "Ciba."
Acetoquinone lumiere R, pure blue, manufactured by "Compagnie Française des Matières Colorantes."
Astrazon GLD, golden yellow, manufactured by "Bayer."
Basacryl 7GL, yellow, manufactured by "Badische Anilin- und Soda-fabrik."
Astrazon M, black, manufactured by "Bayer."
Orasol BG, navy blue, manufactured by "Ciba."
Irgalane 4GL, red, manufactured by "Geigy."
Irgalane GL, blue, manufactured by "Geigy."
Polaire GSN, orange, manufactured by "Geigy."
Polaire RS concentrated, red, manufactured by "Geigy."
Polaire GAW, blue, manufactured by "Geigy."
Chlorantine lumiere 5 GLL, yellow, manufactured by "Ciba."
Chlorantine lumiere 5 BRL, red, manufactured by "Ciba."
Chlorantine lumiere BLL, blue, manufactured by "Ciba."

By high polymers, I intend to cover those polymers having a molecular weight at least as high as 10,000.

It will be understood that, while there have been given herein certain specific embodiments exemplifying the practice of this invention, it is not intended thereby to have this invention limited to or circumscribed by the specific details of materials, proportions or conditions herein specified, in view of the fact that the invention may be modified according to individual preference or conditions

What I claim is:

1. A process for improving the properties of a normally solid high polymer, selected from the group consisting of polymers of α-ethylenically unsaturated hydrocarbons, polyvinyl chloride, polyvinyl formal, polyvinyl acetal, polyvinyl butyral, polyvinylidene chloride, polyacrylonitrile, polymethacrylonitrile, and polyesters comprising the step of treating said polymer with a chromyl halide to improve dyability.

2. A process for improving properties of a normally solid high polymer, comprising the step of treating said polymer selected from the group consisting of polymers of α-ethylenically unsaturated hydrocarbons polyvinylchloride, polyvinyl formal, polyvinyl acetal, polyvinyl butynal, polyvinylidene chloride, polyacrylonitrile, polymethacrylonitrile, and polyesters, with chromyl chloride to improve dyability.

3. A process for improving the properties of polypropylene comprising the step of treating said polymer with a chromyl halide to improve dyability, said treatment being conducted at a temperature lower than that at which said polymer is decomposed.

4. A process for improving the physical and chemical properties of a hydrocarbon high polymer, comprising the step of treating said polymer with chromyl chloride to improve dyability, said treatment being conducted at a temperature lower than that at which said polymer is decomposed.

5. A process for improving the properties of a molded article made of a normally solid high polymer, selected from the group consisting of polymers of alpha-ethylenically unsaturated hydrocarbon, polyvinylidene chloride, polyacrylonitrile, polymethacrylonitrile, and polyesters comprising the step of contacting the surface of said article with a chromyl halide at a temperature lower than the softening temperature of said polymer.

6. The process according to claim 1, wherein the chromyl halide is formed in situ.

7. The process according to claim 2, wherein the chromyl chloride is formed in situ.

8. The process according to claim 5, wherein the chromyl halide is formed in situ.

9. The process according to claim 1, wherein the chromyl halide used is in the gaseous state.

10. The process according to claim 1, wherein the chromyl halide used is in the liquid state.

11. The process according to claim 2, wherein the chromyl chloride used is in the gaseous state.

12. The process according to claim 2, wherein the chromyl chloride used is in the liquid state.

13. The process according to claim 5, wherein the chromyl halide used is in the gaseous state.

14. The process according to claim 5, wherein the chromyl halide used is in the liquid state.

15. The process according to claim 1, wherein the chromyl halide is dissolved in a substantially inert solvent therefor.

16. The process according to claim 2, wherein the chromyl chloride is dissolved in a substantially inert solvent therefor.

17. The process according to claim 5, wherein the chromyl halide is dissolved in a substantially inert solvent therefor.

18. A molded article as produced by the process of claim 5.

19. Polypropylene having improved dyability as produced by the process of claim 3.

References Cited by the Examiner

UNITED STATES PATENTS

| | | | |
|---|---|---|---|
| 2,116,635 | 5/38 | Matheson | 260—73 |
| 2,129,450 | 9/38 | Talbot | 260—73 |
| 2,270,706 | 1/42 | Heymann | 8—55 |
| 2,306,880 | 12/42 | Heymann | 8—55 |
| 2,668,134 | 2/54 | Horton | 260—94.9 |
| 2,886,561 | 5/59 | Reynolds et al. | 260—94.92 |

OTHER REFERENCES

Mellor: A Comprehensive Treatise on Inorganic and Theoretical Chemistry, vol. XI, (1931), pages 395 and 396.

JOSEPH L. SCHOFER, *Primary Examiner.*

M. O. WOLK, L. H. GASTON, *Examiners.*